United States Patent
Wu et al.

(10) Patent No.: US 11,019,559 B2
(45) Date of Patent: May 25, 2021

(54) VHT OPERATION INFORMATION SUBFIELD DESIGN IN WLAN

(71) Applicant: MEDIATEK INC., Hsinchu (TW)

(72) Inventors: Tianyu Wu, Fremont, CA (US);
Chao-Chun Wang, Taipei (TW);
Chien-Fang Hsu, Taoyuan (TW);
James June-Ming Wang, San Marino, CA (US); Jianhan Liu, San Jose, CA (US); Thomas Edward Pare, Jr., Mountain View, CA (US)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/372,983

(22) Filed: Dec. 8, 2016

(65) Prior Publication Data

US 2017/0171796 A1      Jun. 15, 2017

Related U.S. Application Data

(60) Provisional application No. 62/264,953, filed on Dec. 9, 2015.

(51) Int. Cl.
*H04W 48/10*      (2009.01)
*H04W 48/16*      (2009.01)
(Continued)

(52) U.S. Cl.
CPC ............ *H04W 48/16* (2013.01); *H04W 48/10* (2013.01); *H04W 72/02* (2013.01); *H04W 84/12* (2013.01)

(58) Field of Classification Search
CPC ..... H04W 48/16; H04W 84/12; H04W 72/02; H04W 72/0453; H04W 4/50; H04W 74/002; H04W 48/10
See application file for complete search history.

(56) References Cited

U.S. PATENT DOCUMENTS 6,839,025 B1   1/2005  Reigle
7,126,533 B2  10/2006  Fiore
(Continued)

FOREIGN PATENT DOCUMENTS

CN   102149192        8/2011
CN   103299669 A      9/2013
(Continued)

OTHER PUBLICATIONS

IEEE Std 802.11ac™ —2013 (Dec. 18, 2013) p. ii and 99.*
(Continued)

*Primary Examiner* — Un C Cho
*Assistant Examiner* — Shah M Rahman

(57) ABSTRACT

A method of very high throughput (VHT) operation information subfields design for IEEE 802.11 WLAN is proposed. The VHT operation information subfields comprise a channel width, a channel center frequency segment 0 (CCFS0), and a channel center frequency segment 1 (CCFS1). Multiple definitions of the VHT operation information subfields have been adopted by different access points (AP)s and wireless stations (STAs). In accordance with one novel aspect, upon receiving the VHT operation information element broadcasted by an AP, an STA will first check the channel width indicated by the AP. The STA then follows different definitions under different channel widths. Under such method, the STA can support up to 160 MHz operation mode with APs following different definitions and operating up to 160 MHz mode.

11 Claims, 5 Drawing Sheets

(51) Int. Cl.
*H04W 84/12* (2009.01)
*H04W 72/02* (2009.01)

(56) References Cited

U.S. PATENT DOCUMENTS

| | | | |
|---|---|---|---|
| 8,213,527 B2 | 7/2012 | Wang | |
| 8,619,641 B2 | 12/2013 | Guo | |
| 8,879,993 B2 | 11/2014 | Palin et al. | |
| 8,929,192 B2 | 1/2015 | Kainulainen et al. | |
| 9,231,809 B2 | 1/2016 | Azizi et al. | |
| 9,331,883 B1* | 5/2016 | Schelstraete | H04L 27/2626 |
| 9,615,214 B2 | 4/2017 | Syrjarinne et al. | |
| 9,647,868 B2 | 5/2017 | Jiao et al. | |
| 9,739,878 B2 | 8/2017 | Gudim et al. | |
| 2001/0006540 A1 | 7/2001 | Kim et al. | |
| 2006/0158374 A1 | 7/2006 | Rahamin et al. | |
| 2008/0191941 A1 | 8/2008 | Saban et al. | |
| 2008/0232485 A1 | 9/2008 | Niu et al. | |
| 2009/0122890 A1 | 5/2009 | Wu | |
| 2010/0246720 A1 | 9/2010 | Wang et al. | |
| 2011/0033004 A1 | 2/2011 | Wang et al. | |
| 2011/0193739 A1 | 8/2011 | Strauch et al. | |
| 2011/0243197 A1 | 10/2011 | Atarashi et al. | |
| 2011/0261858 A1 | 10/2011 | Baldemair et al. | |
| 2011/0274003 A1 | 11/2011 | Pare, Jr. et al. | |
| 2012/0213204 A1* | 8/2012 | Noh | H04W 40/02 370/331 |
| 2012/0256726 A1 | 10/2012 | Honkanen et al. | |
| 2012/0258669 A1 | 10/2012 | Honkanen et al. | |
| 2012/0263211 A1 | 10/2012 | Porat et al. | |
| 2013/0039200 A1* | 2/2013 | Park | H04W 16/14 370/252 |
| 2013/0070701 A1* | 3/2013 | Merlin | H04W 28/20 370/329 |
| 2013/0089121 A1 | 4/2013 | Koo et al. | |
| 2013/0136016 A1* | 5/2013 | Lee | H04W 84/12 370/252 |
| 2013/0265907 A1* | 10/2013 | Kim | H04W 88/06 370/254 |
| 2013/0321209 A1 | 12/2013 | Kalliola et al. | |
| 2013/0343211 A1 | 12/2013 | Liu et al. | |
| 2014/0010223 A1* | 1/2014 | Wang | H04W 48/12 370/338 |
| 2014/0070996 A1 | 3/2014 | Kneckt et al. | |
| 2014/0105170 A1 | 4/2014 | Seok et al. | |
| 2014/0219449 A1 | 8/2014 | Shattil et al. | |
| 2014/0254648 A1 | 9/2014 | Van Nee | |
| 2014/0293983 A1* | 10/2014 | Amiri | H04W 74/002 370/338 |
| 2014/0328335 A1 | 11/2014 | Zhang | |
| 2014/0348047 A1* | 11/2014 | Park | H04W 52/0206 370/311 |
| 2015/0009894 A1 | 1/2015 | Vermani et al. | |
| 2015/0023449 A1 | 1/2015 | Porat et al. | |
| 2015/0124739 A1* | 5/2015 | Baik | H04W 72/0453 370/329 |
| 2015/0139091 A1 | 5/2015 | Azizi et al. | |
| 2015/0139115 A1* | 5/2015 | Seok | H04W 72/0453 370/329 |
| 2015/0230231 A1* | 8/2015 | Fornoles, Jr. | H04B 7/0452 455/509 |
| 2015/0237631 A1* | 8/2015 | Noh | H04W 72/0453 370/329 |
| 2015/0296516 A1* | 10/2015 | Jung | H04W 72/02 370/312 |
| 2015/0333885 A1 | 11/2015 | Athley | |
| 2015/0365266 A1* | 12/2015 | Zhang | H04L 1/0057 370/330 |
| 2015/0373685 A1* | 12/2015 | Seok | H04W 72/0406 370/329 |
| 2016/0014763 A1 | 1/2016 | Jauh et al. | |
| 2016/0021568 A1 | 1/2016 | Yu et al. | |
| 2016/0033614 A1 | 2/2016 | Wang et al. | |
| 2016/0047885 A1 | 2/2016 | Wang et al. | |
| 2016/0065467 A1 | 3/2016 | Wu et al. | |
| 2016/0164646 A1* | 6/2016 | Kwon | H04L 43/16 370/252 |
| 2016/0165519 A1 | 6/2016 | Abraham | |
| 2016/0174200 A1 | 6/2016 | Seok | |
| 2016/0248542 A1 | 8/2016 | Liu et al. | |
| 2016/0249165 A1* | 8/2016 | Aldana | H04W 4/023 |
| 2016/0323060 A1 | 11/2016 | Hassanin et al. | |
| 2016/0330055 A1 | 11/2016 | Tong | |
| 2016/0352552 A1 | 12/2016 | Liu et al. | |
| 2016/0366548 A1 | 12/2016 | Wang et al. | |
| 2016/0370450 A1 | 12/2016 | Thorn et al. | |
| 2017/0048862 A1 | 2/2017 | Choi et al. | |
| 2017/0064718 A1 | 3/2017 | Bharadwaj et al. | |
| 2017/0070893 A1 | 3/2017 | Wang et al. | |
| 2017/0070998 A1 | 3/2017 | Wu et al. | |
| 2017/0093546 A1 | 3/2017 | Wu et al. | |
| 2017/0099089 A1 | 4/2017 | Liu et al. | |
| 2017/0104553 A1 | 4/2017 | Liu et al. | |
| 2017/0134207 A1 | 5/2017 | Liu et al. | |
| 2017/0171363 A1 | 6/2017 | Sun et al. | |
| 2017/0180177 A1 | 6/2017 | Wu et al. | |
| 2017/0181136 A1 | 6/2017 | Bharadwaj et al. | |
| 2017/0214507 A1 | 7/2017 | Kang et al. | |
| 2017/0215087 A1 | 7/2017 | Amizur et al. | |
| 2017/0230220 A1 | 8/2017 | Anwyl et al. | |
| 2017/0230981 A1 | 8/2017 | Ryu et al. | |
| 2018/0013527 A1 | 1/2018 | Sun et al. | |

FOREIGN PATENT DOCUMENTS

| | | |
|---|---|---|
| CN | 103814604 A | 5/2014 |
| CN | 104221456 A | 12/2014 |
| CN | 104584576 A | 4/2015 |
| CN | 105939186 | 9/2016 |
| EP | 3098999 | 11/2016 |
| TW | 201618501 | 5/2016 |
| WO | 2004049498 | 6/2004 |
| WO | 2010022785 | 3/2010 |
| WO | 2015069811 | 5/2015 |
| WO | 2015077042 | 5/2015 |
| WO | 2016126034 | 8/2016 |
| WO | 2016178534 | 11/2016 |
| WO | 2017003229 | 1/2017 |
| WO | 2017027479 | 2/2017 |
| WO | 2017035235 | 3/2017 |

OTHER PUBLICATIONS

IEEE 802.11-15/1530r0 (Nov. 2015) pp. 2 and 3.*
IEEE, "IEEE Std 802.11ac™ —2013 Part 11: Wireless LAN Medium Access Control (MAC) and Physical Layer (PHY) Specifications Amendment 4: Enhancements for Very High Throughput for Operation in Bands below 6 GHz", Dec. 2013, IEEE Computer Society. Total pp. 15 (Front, 46-50, 93-99, 296-297) (Year: 2013).*
Watson, R., "White Paper Understanding the IEEE 802.11ac Wi-Fi Standard", Sep. 2012, Meru Networks, Total pp. 10 (Year: 2012).*
Wentink et al., "VHT160 operation signaling through non-zero CCFS1", Jan. 2016, Qualcomm, IEEE P802.11 Wireless LANs—IEEE 802.11-15/1530r4, Total pp. 6 (Year: 2016).*
Darryn Lowe et al., "Analysis and Evaluation of MB-OFDM Dual Carrier Modulation", Telecommunicatins Information Technology Research Institute, University of Wollongong.
EPO, Search Report for the EP Patent Application 15833049.8 dated Feb. 16, 2018 (9 Pages).
International Search Report and Written Opinion of International Search Authority for PCT/CN2015/087365 dated Nov. 24, 2015 (10 Pages).
EPO, Search Report for the EP Patent Application 16191047.6 dated Feb. 14, 2017 (7 Pages).
EPO, Search Report for the EP Patent Application 16187569.5 dated Jan. 23, 2017 (12 Pages).
EPO, Search Report for the EP Patent Application 16193438.5 dated Mar. 17, 2017 (9 Pages).
EPO, Search Report for the EP Patent Application 16197315.1 dated Mar. 31, 2017 (8 Pages).

(56) References Cited

OTHER PUBLICATIONS

Young Hoon Kwon, Newracom, SIG Field Design Principle for 11AZ, Doc.: IEEE 802.11-15/0344R2, Mar. 2015 *Slides 5-14*.
Robert Stacey, Intel, Specification Framework for Tgax, IEEE P802.11 Wireless LANs, Jul. 2015 *p. 3, Line 25-39*, * p. 4, Line 1-5*, *Sections 3.2.2, 3.2.3, 3.3.2, 4.1*.
Katsuo Yunoki, KDDI R&D Laboratories, Considerations on He-Sig-A/B, Doc.: IEEE 802.11-15/827R2, Jul. 2015 *Slides 2-11*.
Joonsuk Kim, et al., He-Sig-B Structure, Doc.: IEEE 802.11-15/0821R2, Sep. 2015 *Slides 11-15*.
Joonsuk Kim, Apple, He-Sig-B Structure, Doc.: IEEE 802.11-15/0821R2, Jul. 2015 *Slides 8-15*.
Kaushik Josiam et al., He-Sig-B Contents, Doc.: IEEE802.11-15/1066R0, Sep. 2015, *Slide 8* *Slides 10, 11* *Slide 17*.
M. Rahaim et al., Wife Phy Standards Review—From Early 802.11 to 'AC' and 'AD', MCL Technical Report No. Apr. 29, 2014.
Robert Stacey, Intel, Specification Framework for TGAX, IEEE P802.11 Wireless LANs, Doc.: IEEE 802.11-15/0132R8, Sep. 2015. *Paragraph [3.2.4]*.
Tim Schmidt, "Clause 6 OFDM Phy Draft", Jan. 2010 IEEE P802.15-10-0013-00-004G, IEEE P802.15 Wireless Personal Area Networks, Progect IEEE P802.15 Working Group for Wireless Personal Area Networks (WPANs).
EPO, Search Report for the EP Patent Application 16187569.5 dated Nov. 9, 2017(6 Pages).
Menzo Wentink, Qualcomm,"VHT160 operation signaling through non-zero CCFS1", IEEE P802.11 Wireless LANs, Dec. 2015. pp. 1-6.

* cited by examiner

VHT OPERATION INFORMATION SUBFIELDS DEFINITION 1

| Field | Definition | Encoding |
|---|---|---|
| Channel Width | This field, together with the HT Operation element STA Channel Width field, defines the BSS operating channel width (see 10.40.1 (Basic VHT BSS functionality(11ac))). | Set to 0 for 20 MHz or 40 MHz operating channel width.<br>Set to 1 for 80 MHz operating channel width.<br>Set to 2 for 160 MHz operating channel width.<br>Set to 3 for non-contiguous(#2224) 80+80 MHz operating channel width.<br>Values in the range 4 to 255 are reserved. |
| Channel Center Frequency Segment 0 | Defines the channel center frequency for an 80 and 160 MHz VHT BSS and the frequency segment 0 channel center frequency for an 80+80 MHz VHT BSS. See 22.3.14 (Channelization). | For 80 MHz or 160 MHz operating channel width, indicates the channel center frequency index for the 80 MHz or 160 MHz channel on which the VHT BSS operates.<br>For 80+80 MHz operating channel width, indicates the channel center frequency index for the 80 MHz channel of frequency segment 0 on which the VHT BSS operates.<br>Reserved otherwise. |
| Channel Center Frequency Segment 1 | Defines the frequency segment 1 channel center frequency for an 80+80 MHz VHT BSS. See 22.3.14 (Channelization). | For an 80+80 MHz operating channel width, indicates the channel center frequency index of the 80 MHz channel of frequency segment 1 on which the VHT BSS operates. Reserved otherwise. |

FIG. 3

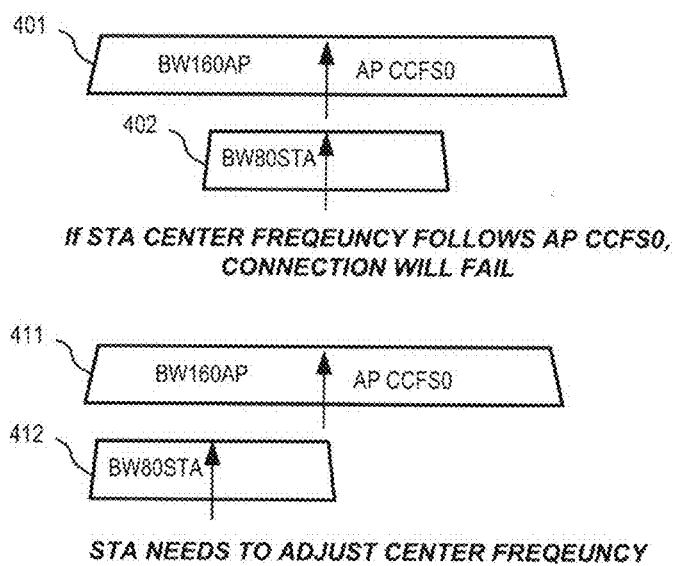

FIG. 4

VHT OPERATION INFORMATION SUBFIELDS DEFINITION 2      500

| Field | Definition | Encoding |
|---|---|---|
| Channel Width | This field, together with the HT Operation element STA Channel Width field, defines the BSS operating channel width (see 10.40.1 (Basic VHT BSS functionality)). | Set to 0 for 20 MHz or 40 MHz operating channel width.<br>Set to 1 for 80 MHz operating channel width.<br>Values in the range 2 to 255 are reserved.<br>NOTE: 160 and 80+80 MHz operating channel width are signaled through a non-0 Channel Center Frequency Segment 1 field. |
| Channel Center Frequency Segment 0 (CCFS0) | Defines the channel center frequency for an 80 MHz VHT BSS. See 22.3.14 (Channelization). | For 80 MHz operating channel width, indicates the channel center frequency index for the 80 MHz channel on which the VHT BSS operates.<br>Reserved otherwise. |
| Channel Center Frequency Segment 1 (CCFS1) | Defines the frequency segment 1 channel center frequency for a 160 or 80+80 MHz VHT BSS. See 22.3.14 (Channelization). | For non-160/80+80 MHz capable devices: Reserved.<br>For 160/80+80 MHz capable devices:<br>For a 160 MHz operating channel width, indicates the channel center frequency index of the 160 MHz channel on which the VHT BSS operates.<br>For an 80+80 MHz operating channel width, indicates the channel center frequency index of the 80 MHz channel of frequency segment 1 on which the VHT BSS operates.<br>See Table 8-xx1 (CCFS1 signaling of 160 and 80+80 MHz operating channel width).<br>Reserved otherwise. |

FIG. 5

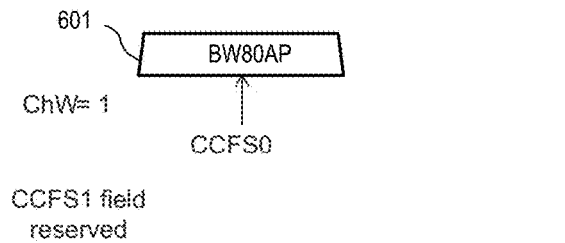

*DEFINITION 2 for AP work in 80Mhz mode*

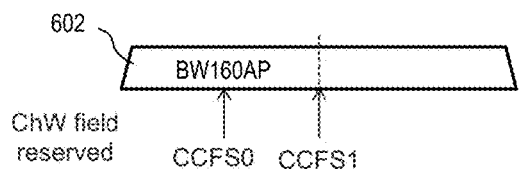

*DEFINITION 2 for AP working in 160Mhz mode*

FIG. 6

VHT OPERATION INFORMATION SUBFIELD DESIGN IN WLAN

CROSS REFERENCE TO RELATED APPLICATIONS

This application claims priority under 35 U.S.C. § 119 from U.S. Provisional Application No. 62/264,953, entitled "VHT Operation Information Subfield Design in WLAN," filed on Dec. 9, 2015, the subject matter of which is incorporated herein by reference.

TECHNICAL FIELD

The disclosed embodiments relate generally to wireless network communications, and, more particularly, to VHT operation information subfields design in wireless communications systems.

BACKGROUND

IEEE 802.11 is a set of standards for implementing wireless local area network (WLAN) communication in the 2.4, 3.6, 5, and 60 GHz frequency bands. Within the IEEE 802.11 standards, IEEE 802.11ac covers very high throughput (VHT) with potential improvements over IEEE 802.11n, IEEE 802.11ah covers Sub 1 GHz sensor network and smart metering, and upcoming IEEE 802.11ax considers the improvement of spectrum efficiency to enhance the system throughput in high-density scenarios of wireless devices and will become a successor to IEEE 802.11ac.

Beacon frame is one of the management frames in IEEE 802.11 based WLANs. It contains all the information about the network. Beacon frames are transmitted periodically to announce the presence of a WLAN. Beacon frames are transmitted by an access point (AP) in an infrastructure basic service set (BSS) to wireless stations (STAs). Typically, beacon frames consist of a MAC/Ethernet header, frame body, and FCS. Some of the fields in the frame body include timestamp, beacon interval, capability information, SSID, and additional parameter sets.

The VHT operation element is the information element used in management frames to set up the operation of the network. The VHT operation information subfields include the channel width, a first channel center frequency segment 0 (CCFS0) and a second channel center frequency segment 1 (CCFS1). Each subfield is predefined such that AP and STA can communicate with each other properly under the predefined channel bandwidth and center frequency. For IEEE 802.11ac wave 1, the maximum operation channel bandwidth for AP and STA is 80 MHz. Typically, STAs set the center frequency directly follow CCFS0 sent by the AP. When 160 MHz APs come to the market, STAs that set their center frequencies directly following the indication in CCFS0 will lead to wrong center frequency, resulting in connection failure. New definition of the VHT operation information subfields thus has been proposed to meet the different versions of STAs in the market. Under the new definition, however, 160 MHz-capable STAs following the old definition are limited to 80 MHz operation mode, and 160 MHz-capable STAs following the new definition cannot connect with APs supporting the old definition.

A solution is sought.

SUMMARY

A method of very high throughput (VHT) operation information subfields design for IEEE 802.11 WLAN is proposed. The VHT operation information subfields comprise a channel width, a channel center frequency segment 0 (CCFS0), and a channel center frequency segment 1 (CCFS1). Multiple definitions of the VHT operation information subfields have been adopted by different access points (AP)s and wireless stations (STAs). In accordance with one novel aspect, a method of supporting different definitions of VHT operation information subfields is proposed. Upon receiving the VHT operation information element broadcasted by an AP, an STA will first check the channel width indicated by the AP. The STA then follows different definitions under different channel widths of the AP. Under such method, the STA can support up to 160 MHz operation mode with APs following different definitions and operating up to 160 MHz mode.

In one embodiment, a wireless station (STA) receives a beacon frame broadcasted from an access point (AP) in a wireless local area network (WLAN). The beacon frame comprises a very high throughput (VHT) operation element. The STA determines a channel width of the BSS based on the VHT operation information subfields in VHT operation element. The VHT operation information subfields further comprises a first center frequency value, and a second center frequency value. The STA determines a center frequency of the STA based on the first center frequency value if the channel width is equal to a first set of predefined values and the STA has an operating channel width. Finally, the STA determines the center frequency based on the second center frequency value if the channel width is equal to a second set of predefined values and the STA has the same operating channel width.

Other embodiments and advantages are described in the detailed description below. This summary does not purport to define the invention. The invention is defined by the claims.

BRIEF DESCRIPTION OF THE DRAWINGS

FIG. 3 illustrates one embodiment of VHT operation information subfields in accordance with a first definition.

FIG. 4 illustrates one embodiment of a wireless station determining the center frequency based on the first definition of VHT operation information subfields.

FIG. 5 illustrates one embodiment of VHT operation information subfields in accordance with a second definition.

FIG. 6 illustrates one embodiment of a wireless station determining the center frequency based on the second definition of VHT operation information subfields.

DETAILED DESCRIPTION

Reference will now be made in detail to some embodiments of the invention, examples of which are illustrated in the accompanying drawings.

Figure 1:
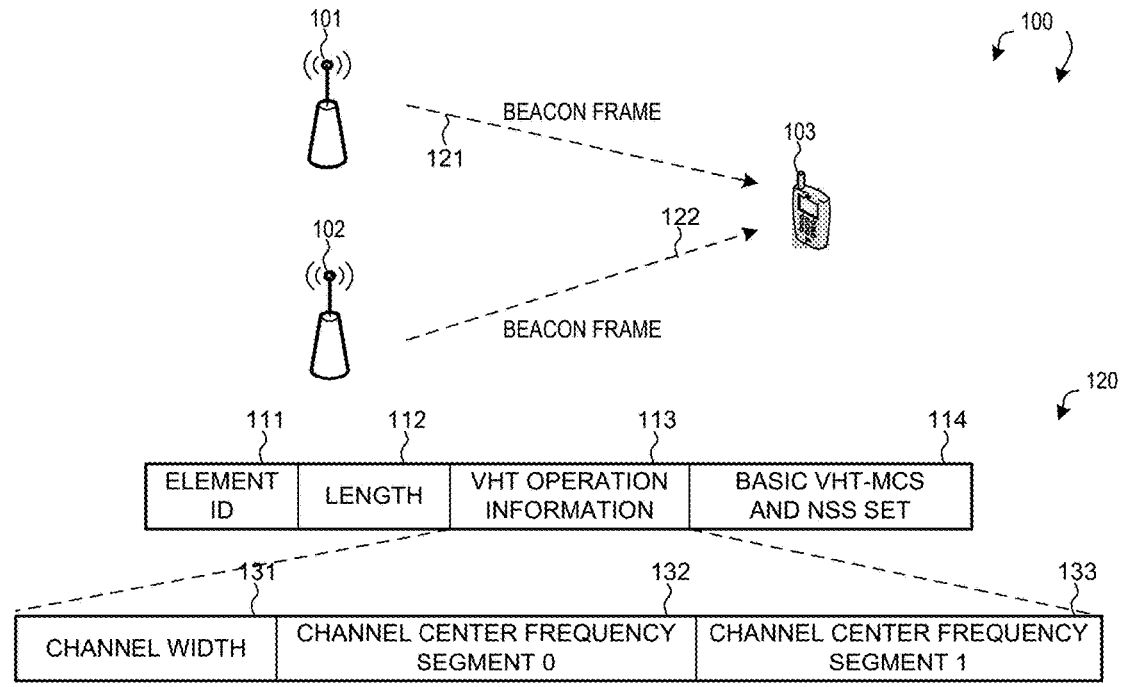
FIG. 1 illustrates a wireless communications system with different definitions for very high throughout (VHT) operation information subfields in accordance with a novel aspect of the present invention.

FIG. 1 illustrates a wireless communications system 100 with different definitions for very high throughout (VHT) operation information subfields in accordance with a novel aspect of the present invention. Wireless local area network WLAN 100 comprises a first wireless access point AP 101, a second wireless access point AP 102, and a wireless station STA 103. In IEEE 802.11 wireless communications systems, wireless devices communicate with each other through various well-defined frame structures. There are four types of frames: management frame, control frame, action frame, and data frame. IEEE 802.11 management frames enable APs and STAs to establish and maintain communications.

Beacon frame is one of the management frames in IEEE 802.11 based WLANs. Beacon frame contains all the information about a WLAN. Beacon frames are transmitted periodically by an AP to STAs to announce the presence of the WLAN. The VHT operation element is the information element used in management frames to set up the operation of the network. In the example FIG. 1, management frame 120 is a beacon frame that carries the VHT operation element. Management frame 120 comprises an element ID field 111, a length field 112, a VHT operation information field 113, and a basic VHT-MCS and NSS set field 114. VHT operation information field 113 further comprises a channel width subfield 131, a channel center frequency segment 0 (CCFS0) subfield 132, and a channel center frequency segment 1 (CCFS1) subfield 133. Each subfield is predefined such that AP and STA can communicate with each other properly.

There are different definitions of the VHT operation information subfields. Under a first definition, for example, the center frequency for both 80 MHz and 160 MHz are indicated by CCFS0. For IEEE 802.11ac wave 1 devices, the maximum operation bandwidth (BW) for AP and STA is 80 MHz. Typically, STAs set the center frequency directly follow CCFS0 sent by the AP. When 160 MHz APs come to the market, 80 MHz STAs setting their center frequency directly following the indication in CCFS0 of 160 MHz APs will lead to wrong center frequency, resulting in connection failure. New definition of the VHT operation information subfields thus has been proposed to meet the different versions of STAs in the market. Under a second definition, for example, the center frequency for 80 MHz and 160 MHz are indicated by CCFS0 and CCFS1 separately. However, 160 MHz-capable STAs following the first definition are limited to 80 MHz operation mode, and 160 MHz-capable STAs following the second definition cannot connect with APs supporting the first definition.

In accordance with one novel aspect, a method of supporting both VHT operation information subfields definition 1 and definition 2 is proposed. Upon receiving the VHT operation information element broadcasted by an AP, an STA will first check the channel width indicated by the AP. If the channel width indicates 160 MHz or 80+80 MHz follow the first definition, then the STA follows the first definition to adjust its center frequency. If the channel width does not indicate 160 MHz or 80+80 MHz, then the STA follows the second definition to adjust its center frequency. Under such method, the STA can support up to 160 MHz operation mode with APs following different definitions and operating up to 160 MHz mode. In the example of FIG. 1, STA 103 may receive beacon frame 121 from AP 101 adopting VHT operation information subfields definition 1, or may receive beacon frame 122 from AP 102 adopting VHT operation information subfields definition 2. STA 103 will first check the channel width subfield indicated by the corresponding AP. STA 103 then follows different VHT operation information subfields definitions accordingly based on the channel width of the AP and based on the operating mode of the STA. As a result, STA 103 is able to support up to 160 MHz operation mode and properly set its center frequency to communication with APs following both VHT operation information subfields definitions.

Figure 2:
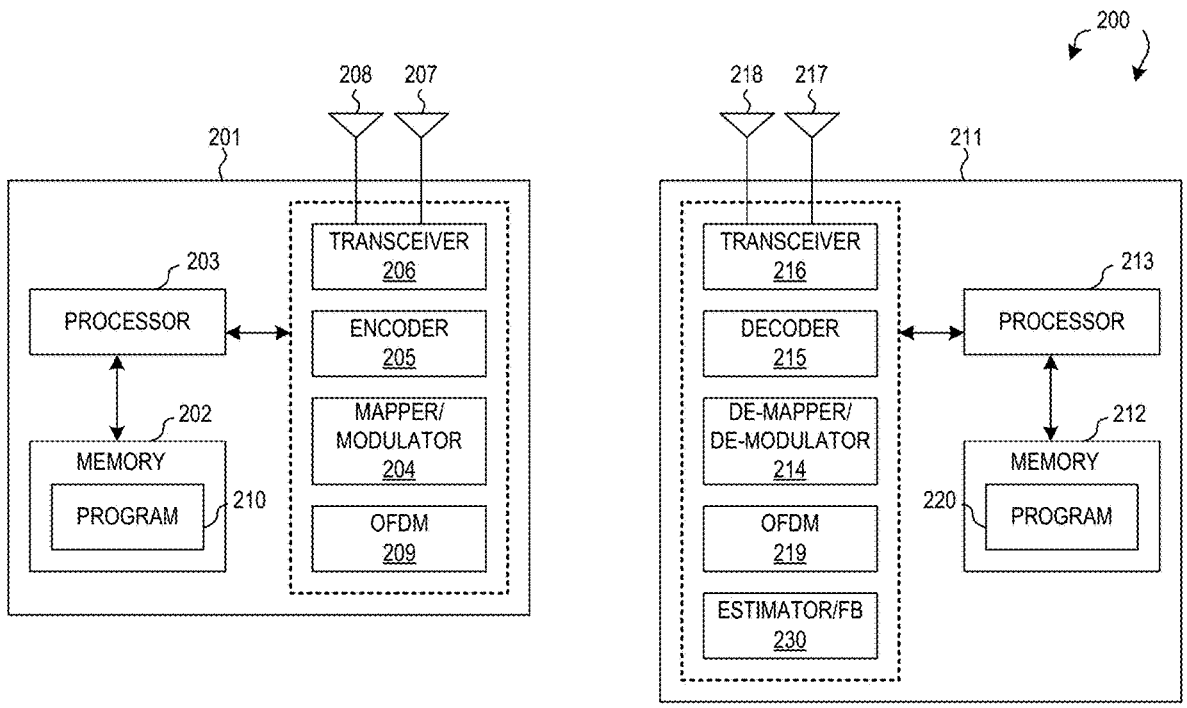
FIG. 2 is a simplified block diagram of a wireless transmitting device and a receiving device in accordance with embodiments of the current invention.

FIG. 2 is a simplified block diagram of wireless devices 201 and 211 in accordance with a novel aspect. For wireless device 201 (e.g., a transmitting device), antennae 207 and 208 transmit and receive radio signal. RF transceiver module 206, coupled with the antennae, receives RF signals from the antennae, converts them to baseband signals and sends them to processor 203. RF transceiver 206 also converts received baseband signals from the processor, converts them to RF signals, and sends out to antennae 207 and 208. Processor 203 processes the received baseband signals and invokes different functional modules and circuits to perform features in wireless device 201. Memory 202 stores program instructions and data 210 to control the operations of device 201.

Similarly, for wireless device 211 (e.g., a receiving device), antennae 217 and 218 transmit and receive RF signals. RF transceiver module 216, coupled with the antennae, receives RF signals from the antennae, converts them to baseband signals and sends them to processor 213. The RF transceiver 216 also converts received baseband signals from the processor, converts them to RF signals, and sends out to antennae 217 and 218. Processor 213 processes the received baseband signals and invokes different functional modules and circuits to perform features in wireless device 211. Memory 212 stores program instructions and data 220 to control the operations of the wireless device 211.

The wireless devices 201 and 211 also include several functional modules and circuits that can be implemented and configured to perform embodiments of the present invention. In the example of FIG. 2, wireless device 201 is a transmitting device that includes an encoder 205, a symbol mapper/modulator 204, an OFDM module 209. Wireless device 211 is a receiving device that includes a decoder 215, a symbol de-mapper/de-modulator 214, a OFDM module 219, and an estimator/feedback circuit 230. Note that a wireless device may be both a transmitting device and a receiving device. The different functional modules and circuits can be implemented and configured by software, firmware, hardware, and any combination thereof. The function modules and circuits, when executed by the processors 203 and 213 (e.g., via executing program codes 210 and 220), allow transmitting device 201 and receiving device 211 to perform embodiments of the present invention.

In one example, at the transmitter side, device 201 (AP) encodes beacon frames with VHT operation information element and transmits to the receiver. At the receiver side, device 211 (STA) receives and decodes the beacon frame and determines the VHT operation information subfields. Based on the channel width indicated by the AP, and based on the operating bandwidth of the STA, the STA adjusts its center frequency based on the CCFS0 and/or CCFS1 accordingly. Various embodiments of such transmitting device and receiving device are now described below with accompany drawings.

FIG. 3 illustrates one embodiment of VHT operation information subfields in accordance with a first definition as depicted by Table 300. VHT operation information subfields comprise a channel width subfield, a channel center frequency segment 0 (CCFS0) subfield, and a channel center frequency segment 1 (CCFS1) subfield. Under the first definition, the channel width defines the BSS operation channel width provided by the AP. Channel width is set to 0 for 20 MHz or 40 MHz operating channel width; Channel width is set to 1 for 80 MHz operating channel width; Channel width is set to 2 for 160 MHz operating channel width; Channel width is set to 3 for non-contiguous 80+80 MHz operating channel width. Channel width with values range 4 to 255 are reserved. For 80 MHz or 160 MHz operating channel width, CCFS0 indicates the channel center frequency index for the 80 MHz or 160 MHz channel on which the VHT BSS operates; for 80+80 MHz operating channel width, CCFS0 indicates the channel center frequency index for the 80 MHz channel of frequency segment 0 on which the VHT BSS operates; for 80+80 MHz operating channel width, CCFS1 indicates the channel center frequency index for the 80 MHz channel of frequency segment 1 on which the VHT BSS operates.

FIG. 4 illustrates one embodiment of a wireless station determining the center frequency based on the first definition of VHT operation information subfields. Under the first definition, the center frequency for both 80 MHz and 160 MHz channels are indicated by the CCFS0 subfield. For IEEE 802.11ac wave 1 devices, the maximum operation bandwidth for AP and STA is 80 MHz. Typically, STAs set the center frequency directly follow CCFS0 sent by the AP. When 160 MHz APs come to the market, 80 MHz STAs that set their center frequencies directly following the indication in the CCFS0 subfield of 160 MHz APs will lead to wrong center frequency, resulting in connection failure. As depicted by the top half of FIG. 4, AP 401 operating at 160 MHz channel width indicates its center frequency using the CCFS0 subfield. STA 402 operating at 80 MHz channel width follows the indication in the CCFS0 subfield to set its own center frequency. As a result, AP 401 and STA 402 are not able to communicate with each other.

To solve this problem, STAs can set their center frequencies based on both the channel width subfield and the CCFS0 subfield. If the channel width is 80+80 MHz (e.g., the channel width subfield is set to 3), then the center frequency of the STA is set to CCFS0. On the other hand, if the channel width is 160 MHz (e.g., the channel width subfield is set to 2), then the center frequency of the STA is adjusted based on CCFS0 accordingly. As depicted by the bottom half of FIG. 4, AP 411 operating at 160 MHz cannel width indicates its channel width is 160 MHz, and indicates its center frequency using the CCFS0 subfield. STA 412 operating at 80 MHz channel width will adjust its center frequency by shifting the center frequency by 40 MHz from CCFS0.

FIG. 5 illustrates one embodiment of VHT operation information subfields in accordance with a second definition as depicted by Table 500. VHT operation information subfields comprise a channel width subfield, a channel center frequency segment 0 (CCFS0) subfield, and a channel center frequency segment 1 (CCFS1) subfield. Under the second definition, the channel width defines the BSS operation channel width provided by the AP. Channel width is set to 0 for 20 MHz or 40 MHz operating channel width; Channel width is set to 1 for 80 MHz operating channel width; Channel width with values range 2 to 255 are reserved. Note that the 160 MHz and the 80+80 MHz operating channel width are not signaled through the channel width subfield, but are rather signaled through a non-zero CCFS1 field. For 80 MHz operating channel width, CCFS0 indicates the channel center frequency index for the 80 MHz channel on which the VHT BSS operates; for 80+80 MHz operating channel width, CCFS0 indicates the channel center frequency index for the 80 MHz channel of frequency segment 0 on which the VHT BSS operates; for 160 MHz operating channel width, CCFS1 indicates the channel center frequency index for the 160 MHz channel on which the VHT BSS operates; for 80+80 MHz operating channel width, CCFS1 indicates the channel center frequency index for the 80 MHz channel of frequency segment 1 on which the VHT BSS operates.

FIG. 6 illustrates one embodiment of a wireless station determining the center frequency based on the second definition of VHT operation information subfields. Under the second definition, the center frequency for 80 MHz channel is indicated by CCFS0, while the center frequency for 160 MHz channel is indicated by CCFS1. As depicted by the top half of FIG. 6, AP 601 operates at 80 MHz channel width. AP 601 set the channel width subfield to one. AP 601 indicates the center frequency using the CCFS0 subfield. The CCFS1 subfields is reserved, e.g., set to 0 in this scenario. As depicted by the bottom half of FIG. 6, AP 602 operates at 160 MHz channel width. AP 602 set the channel width to any value larger than one, which is reserved. AP 602 indicates the center frequency of the 160 MHz channel using the CCFS1 field. Meanwhile, AP 602 continues to use CCFS0 to indicate the center frequency of the primary 80 MHz channel such that STAs following the first definition can also properly communicate with the AP up to the 80 MHz operation mode.

Figure 7A:
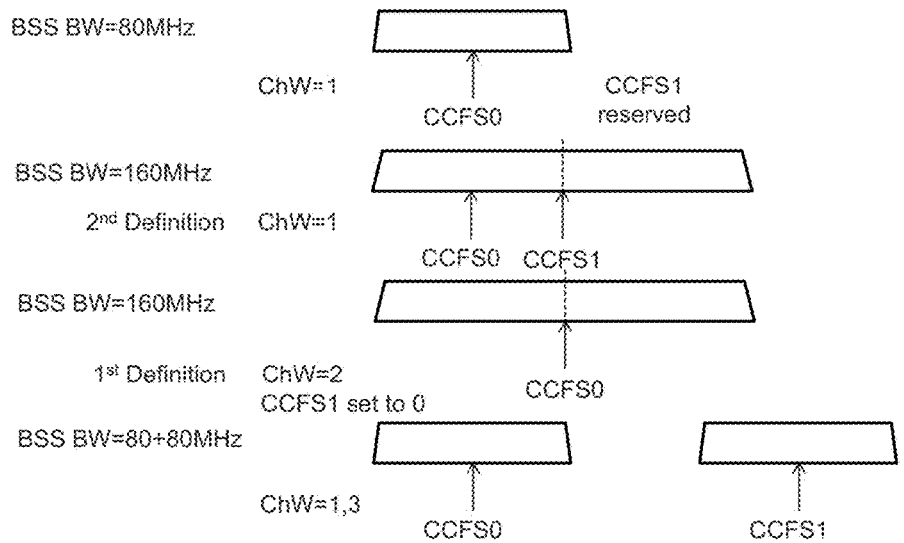
FIG. 7A illustrates one embodiment of a basic service set (BSS) signaling for center frequency by combining the first definition and the second definition of VHT operation information subfields.

FIG. 7A illustrates one embodiment of a basic service set (BSS) signaling for center frequency by combining the first definition and the second definition of VHT operation information subfields. As depicted in FIG. 7A, if the BSS channel width is 80 MHz, then CCFS0 is used to indicate the center frequency, and CCFS1 is reserved. If the BSS channel width is 160 MHz, CCFS1 is used to indicate the center frequency under the second definition; while CCFS0 is used to indicate the center frequency under the first definition and CCFS1 set to 0. If the BSS channel width is 80+80 MHz, then CCFS0 indicates center of the primary 80 MHz and CCFS1 indicates center of the secondary 80 MHz.

Figure 7B:
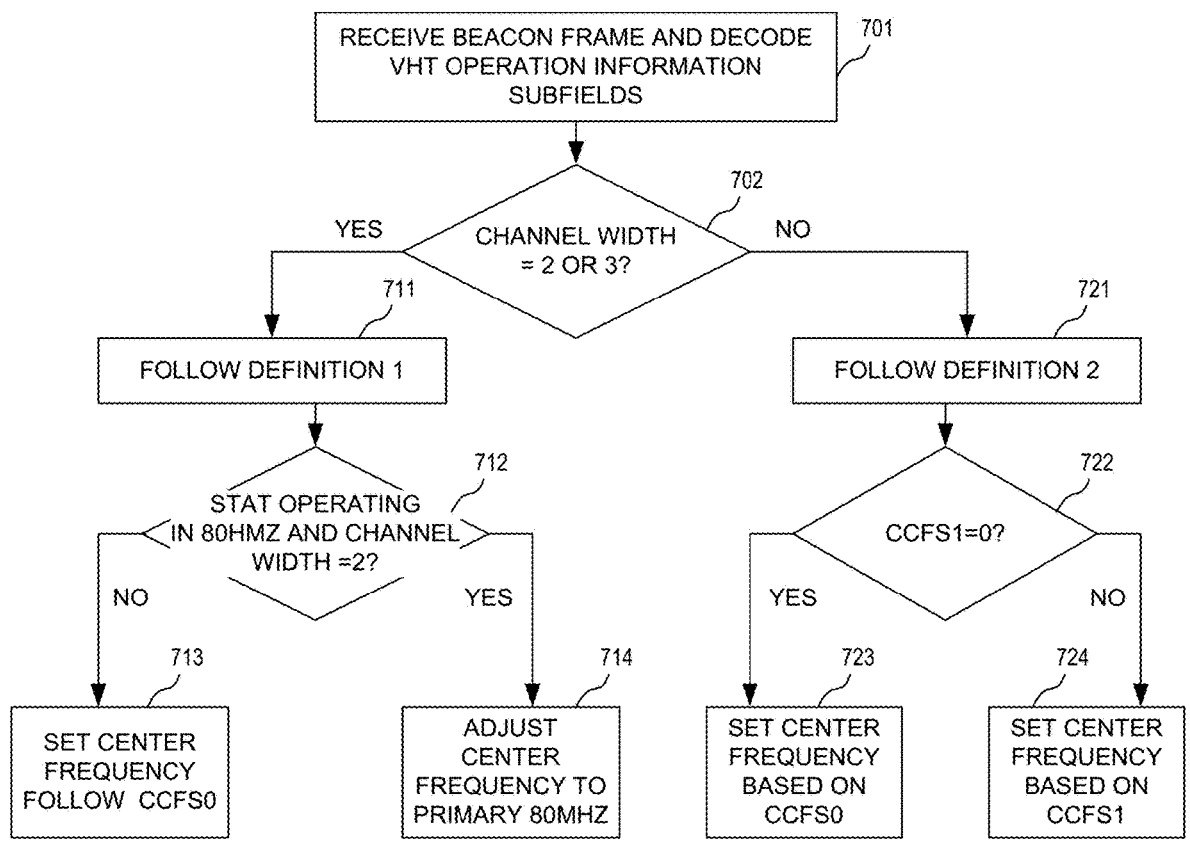
FIG. 7B illustrates a flow chart of a wireless station supporting both definitions 1 and 2 of VHT operation information subfields in accordance with one novel aspect of the present invention.

FIG. 7B illustrates a flow chart of a wireless station supporting both definitions 1 and 2 of VHT operation information subfields in accordance with one novel aspect of the present invention. In step 701, the STA receives a beacon frame and decodes the VHT operation information subfields including the channel width (ChW) subfield, the channel center frequency segment 0 (CCFS0) subfield, and the channel center frequency segment 1 (CCFS1) subfield. In step 702, the STA first checks whether the channel width is equal to 2 or 3 (e.g., ChW=2 or 3). If the channel width is equal to 2 or 3, then it indicates that the AP is operating with channel bandwidth of 160 MHz or 80+80 MHz and the AP follows the first definition of VHT operation information subfields. This is because for APs following the second definition of the VHT operation information subfields, the channel width subfield is reserved for values between 2-255.

If the answer to step 702 is yes, the STA goes to step 711 and follows definition 1 of the VHT operation information subfields. In step 712, the STA checks whether the STA is operating in 80 MHz channel width and whether the AP is operating in 160 MHz channel width (e.g., the channel width subfield ChW=2). If the answer is no, then the STA follows definition 1 and sets its own center frequency as indicated by CCFS0 if the STA is operating in 160 MHz (step 713). If the STA is operating in 80+80 MHz, then the STA sets CCFS0 as the center of its primary 80 MHz, and CCFS1 as the center of its secondary 80 MHz. If the answer is yes, then the STA knows that CCFS0 indicates the absolute center frequency of the 160 MHz channel. Therefore, the STA needs to adjust its own center frequency to the primary 80 MHz channel by shifting 40 MHz from the frequency as indicated by CCFS0 (step 714).

On the other hand, if the answer to step 702 is no, then the STA goes to step 721 and follows definition 2 of the VHT operation information subfields. When the channel width is NOT equal to 2 or 3, then there are two possibilities. In a first possibility, the channel width is equal to 0 or 1 and CCFS1 equals to zero, which indicates that the AP is operating in 20 MHz, 40 MHz, or 80 MHz. In this case, CCFS0 is used to indicate the center frequency under both definition 1 and definition 2. In a second possibility, CCFS1 is a non-zero value, which indicates that the AP is operating in 160 or 80+80 MHz channel width. In this case, CCFS1 is used to indicate the center frequency for 160 MHz channel under definition 2 (e.g., set to non-zero). In step 722, the STA checks whether CCFS1 is set to zero or not. If the answer is yes (e.g., channel width=0 or 1), then the STA follows either definition 1 or definition 2 and set its center frequency as indicated by the CCFS0 subfield (step 723). If the answer is no (e.g., channel width undefined), then the STA follows definition 2 and set its center frequency based on the CCFS1 subfield if the STA is operating at 160 MHz. If the STA is operating at 80 HMz, then the STA set its center frequency based on the CCFS0 subfield. If the STA is operating at 80+80 MHz, then the STA sets CCFS0 as the center of its primary 80 MHz, and CCFS1 as the center of its secondary 80 MHz.

Figure 8:
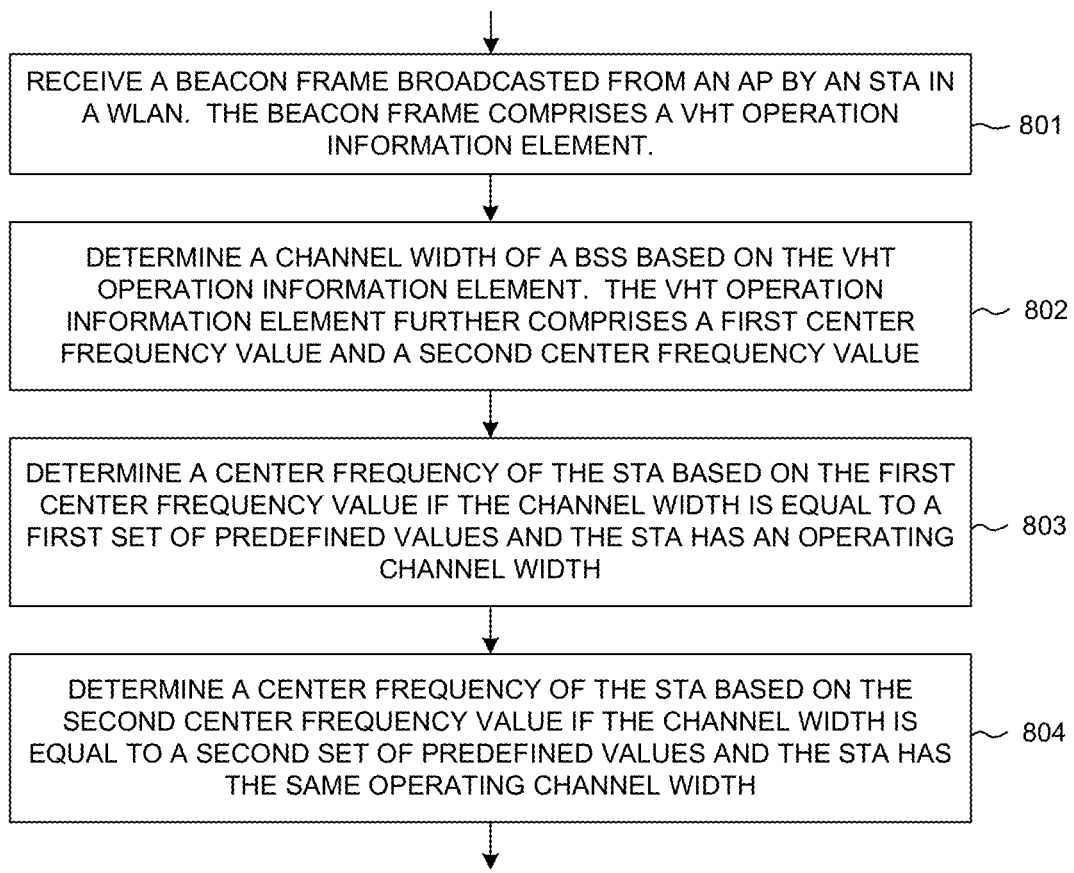
FIG. 8 is a flow chart of a method of supporting both definitions 1 and 2 of VHT operation information subfields in accordance with one novel aspect of the present invention.

FIG. 8 is a flow chart of a method of supporting both definitions 1 and 2 of VHT operation information subfields in accordance with one novel aspect. In step 801, a wireless station (STA) receives a beacon frame broadcasted from an access point (AP) in a wireless local area network (WLAN). The beacon frame comprises a very high throughput (VHT) operation information element. In step 802, the STA determines a channel width of a BSS based on the VHT operation information element. The VHT operation information element further comprises a first center frequency value, and a second center frequency value. In step 803, the STA determines a center frequency of the STA based on the first center frequency value if the channel width is equal to a first set of predefined values and the STA has an operating channel width. In step 804, the STA determines the center frequency based on the second center frequency value if the channel width is equal to a second set of predefined values and the STA has the same operating channel width. In one embodiment, the AP uses the first center frequency value to indicate the center frequency for both 80 MHz and 160 MHz channel width. In another embodiment, the AP uses the first center frequency value and the second center frequency value to indicate the center frequency for 80 MHz and 160 MHz channel width respectively.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   receiving a beacon frame broadcasted from an access point (AP) by a wireless station (STA) in a wireless local area network (WLAN), wherein the beacon frame comprises a very high throughput (VHT) operation information element, and wherein the AP uses a first center frequency value to indicate the center frequency for both 80 MHz and 160 MHz channel widths;
   determining a BSS channel width of a basic service set (BSS) based on the VHT operation information element, wherein the VHT operation information element comprises:
      a channel width subfield;
      the first center frequency value; and
      a second center frequency value;
   determining a center frequency of the STA based on the first center frequency value if the channel width is equal to a first set of predefined values, and the BSS operating channel width is 160 MHz, wherein said determining comprises:
      adopting the first center frequency as the center frequency if the operating channel width of the STA is 80 MHz;
   determining the center frequency based on the second center frequency value if the channel width is equal to a second set of predefined values and the STA has an operating channel width same as the BSS operating channel width, wherein said determining comprises:
      adopting the second center frequency value as the center frequency if the second center frequency value is non-zero and the operating channel width of the STA is 160 MHz; and
      adopting the first center frequency value as the center frequency for a primary 80 MHz channel and adopting the second center frequency value as the center frequency for a secondary 80 MHz channel when the operating channel width of the STA is 80+80 MHz; and
   determining the center frequency based on a different VHT operation element definition if the channel width subfield is set to a value other than 160 MHz or 80+80 MHz.

2. The method of claim 1, further comprising the AP using the first center frequency value and the second center frequency value to indicate the center frequency for 80 MHz and 160 MHz channel widths respectively.

3. The method of claim 1, wherein the BSS channel width is equal to the first set of predefined values, and the BSS channel width is one of 160 MHz and 80+80 MHz.

4. The method of claim 3, further comprising the STA adopting the first center frequency value if the operating channel width of the STA is 160 MHz.

5. The method of claim 1, wherein the BSS channel width is equal to the second set of predefined values.

6. The method of claim 5, further comprising the STA adopting the first center frequency value as the center frequency if the second center frequency value is zero.

7. A wireless station (STA), comprising:
   a receiver operable to receive a beacon frame broadcast from an access point (AP) in a wireless local area network (WLAN), wherein the beacon frame comprises a very high throughput (VHT) operation information element, wherein the AP is operable to use a first center frequency value to indicate the center frequency for both 80 MHz and 160 MHz channel widths;

a decoder operable to decode a BSS channel width of a basic service set (BSS) based on the VHT operation information element, wherein the VHT operation information element further comprises:
a channel width subfield;
the first center frequency value; and
a second center frequency value; and
a radio frequency (RF) transceiver operable to:
determine a center frequency of the STA based on the first center frequency value if the BSS channel width is equal to a first set of predefined values, and the BSS operating channel width is 160 MHz, wherein said determining comprises:
  adopting the first center frequency as the center frequency if the operating channel width of the STA is 80 MHz;
determine the center frequency based on the second center frequency value if the BSS channel width is equal to a second set of predefined values and the STA has an operating channel width that is equal to the BSS channel width, wherein said determining comprises:
adopting the second center frequency value as the center frequency if the second center frequency value is non-zero and the operating channel width of the STA is 160 MHz; and
adopting the first center frequency value as the center frequency for a primary 80 MHz channel and adopting the second center frequency value as the center frequency for a secondary 80 MHz channel when the operating channel width of the STA is 80+80 MHz; and
determine the center frequency based on a different VHT operation element definition if the channel width subfield is set to a value other 160 MHz or 80+80 MHz.

8. The wireless STA of claim 7, wherein the AP is operable to use the first center frequency value and the second center frequency value to indicate the center frequency for 80 MHz and 160 MHz channel widths respectfully.

9. The wireless STA of claim 7, wherein the first center frequency value is adopted as the center frequency if the operating channel width of the STA is 160 MHz.

10. The wireless STA of claim 7, wherein the BSS channel width is equal to the second set of predefined values.

11. The wireless STA of claim 10, wherein the first center frequency value is adopted as the center frequency if the second center frequency value is zero.

* * * * *